US008170581B2

(12) United States Patent
Choo et al.

(10) Patent No.: US 8,170,581 B2
(45) Date of Patent: May 1, 2012

(54) SYSTEMS FOR TRACKING KIDNAPPED HOSTAGE TRACKING SYSTEMS, TRANSMITTERS USED IN THE SAME, SENSOR NETWORK GATEWAYS USED IN THE SAME, AND METHODS OF TRACKING KIDNAPPED HOSTAGE

(75) Inventors: Hyunseung Choo, Gwacheon-si (KR); Jaewan Seo, Suwon-si (KR); Jaehyung Lee, Seoul (KR); Jinwook Park, Seoul (KR); Soko Jang, Seoul (KR)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 460 days.

(21) Appl. No.: 12/385,424

(22) Filed: Apr. 8, 2009

(65) Prior Publication Data

US 2009/0253402 A1 Oct. 8, 2009

(30) Foreign Application Priority Data

Apr. 8, 2008 (KR) ........................ 10-2008-0032656

(51) Int. Cl.
*H04W 24/00* (2009.01)

(52) U.S. Cl. ............... 455/456.1; 455/456.2; 455/456.3; 455/456.4; 455/457

(58) Field of Classification Search .... 455/456.1–456.6, 455/457
See application file for complete search history.

(56) References Cited

U.S. PATENT DOCUMENTS

| | | | | |
|---|---|---|---|---|
| 5,705,980 | A * | 1/1998 | Shapiro | 340/539.11 |
| 6,075,442 | A * | 6/2000 | Welch | 340/573.1 |
| 6,700,493 | B1 * | 3/2004 | Robinson | 340/573.1 |
| 7,002,473 | B2 * | 2/2006 | Glick et al. | 340/572.1 |
| 7,697,940 | B2 * | 4/2010 | Jung et al. | 455/456.1 |
| 7,898,423 | B2 * | 3/2011 | Cavanaugh | 340/573.1 |
| 7,912,628 | B2 * | 3/2011 | Chapman et al. | 701/117 |
| 2005/0186938 | A1 * | 8/2005 | Hunter | 455/404.2 |
| 2006/0238333 | A1 * | 10/2006 | Welch et al. | 340/539.12 |
| 2008/0026770 | A1 * | 1/2008 | Rudravaram et al. | 455/456.1 |
| 2008/0139112 | A1 * | 6/2008 | Sampath et al. | 455/3.04 |

FOREIGN PATENT DOCUMENTS

| | | |
|---|---|---|
| KR | 10-0627655 | 9/2006 |

* cited by examiner

*Primary Examiner* — Kamran Afshar
*Assistant Examiner* — Yousef Rod
(74) *Attorney, Agent, or Firm* — Harness, Dickey & Pierce, P.L.C.

(57) ABSTRACT

A system for tracking location of person having signal transmitter includes at least one receiver for receiving unique ID signal transmitted by signal transmitter that transmits ID signal uniquely determined for respective mobile signal transmitter at at least one predetermined period. The receiver receives unique ID signal near circumference of the person having signal transmitter spaced apart from the receiver by given distance, and stores the received unique ID signal in ID store unit. The receiver, when search request for specific ID is received from external server, searches for the requested ID in ID store unit and transmits transmission information including ID corresponding to requested ID to external server. The person, such as abducted person, has only small signal transmitter, and thus the current location of the abducted person and path along which the abducted person moved can be tracked using the signal continually transmitted by the signal transmitter.

7 Claims, 5 Drawing Sheets

SYSTEMS FOR TRACKING KIDNAPPED HOSTAGE TRACKING SYSTEMS, TRANSMITTERS USED IN THE SAME, SENSOR NETWORK GATEWAYS USED IN THE SAME, AND METHODS OF TRACKING KIDNAPPED HOSTAGE

CLAIM FOR PRIORITY

This application claims priority to Korean Patent Application No. 2008-0032656 filed on Apr. 8, 2008 in the Korean Intellectual Property Office (KIPO), the entire contents of which are hereby incorporated by reference.

BACKGROUND

1. Technical Field

Example embodiments of the present invention relate to systems for tracking the past and current locations of a person, who has a signal transmitter, such as a missing child or an abducted person using a signal transmitted by the signal transmitter held by the missing child or the abducted person, signal transmitters, sensor network gateways used in the same, and methods of tracking the location of the person having the signal transmitter.

2. Description of the Related Art

Kidnapping and abduction has caused social problems. Besides such crimes, many accidents such as missing child, disappearance have happened. Conventionally, there were methods of locating a mobile communication terminal held by a person using a Global Positioning System (GPS) for the purpose of locating abducted persons or missing children.

However, according to such methods, there is an assumption that abducted persons or missing children should always have a mobile communication terminal after they are abducted or lost, but, in actual situations, it is rarely possible for them to keep having the mobile communication terminal with themselves.

A recently developed method of locating an abducted person or a missing child using a short-range wireless communication technique is disclosed in Korean Patent No. 627655 (entitled as "Method of requesting SOS using a wireless ID and a data transmitting device). According to Korean Patent No. 627655, a person in an emergency situation must press a button for requesting SOS, but, in the real situations, there are many situations where it is hard for the person in the emergency situation to press the button—for example, a situation in which a child cannot press the button easily, a situation in which a person is abducted, tied up or fall unconscious abruptly, a situation in which a person is hit by a car in an instant—therefore, the method of locating an abducted person or a missing child according to Korean Patent No. 627655 cannot be used in practical situations.

Furthermore, according to Korean Patent No. 627655, it is impossible to acquire a location of an abducted person or a missing child when a mobile communication terminal of another person does not exist near the abducted person or the missing child in emergency situations.

Furthermore, according to Korean Registration Patent No. 627655, an SOS signal is simply transmitted to a central control office via mobile communication terminals of another person near a signal transmitter of the abducted person or the missing child, so that the method of Korean Patent No. 627655 cannot provide reliable and systematic protection of abducted persons or missing children.

SUMMARY

Accordingly, example embodiments of the present invention provide systems for tracking the location of an abducted person or a missing child having a signal transmitter and the path along which an abducted person or a missing child moved using unique ID signal continually transmitted at at least one predetermined period from the signal transmitter, signal transmitters, sensor networks used in the systems, and methods of tracking the location of the person having a signal transmitter.

In one example embodiment, a system for tracking a location of a person having a mobile signal transmitter tracks the location of the person having the signal transmitter in conjunction with the mobile signal transmitter for transmitting an Identification (ID) signal that is uniquely determined for respective mobile signal transmitter. The system includes at least one receiver configured to receive the unique ID signal transmitted by the signal transmitter, wherein the at least one receiver receives the unique ID signal near circumference of the person having the signal transmitter spaced apart from the receiver by a given distance, and stores the received unique ID signal in an ID store unit, and wherein the at least one receiver, when a search request for a specific ID is received from an external server, searches for the requested ID in the ID store unit and transmits transmission information including an ID corresponding to the requested ID to the external server.

In another example embodiment, a system for tracking a location of a person having a signal transmitter using a sensor network interworking with an internet network includes at least one sensor network gateway configured to detect an unique Identification (ID) signal from a mobile signal transmitter for continually transmitting the unique ID signal at at least one predetermined period, and configured to generate a detection message including the unique ID; and a backbone gateway configured to interwork with the internet network in a multi-hop way, configured to receive the detection message, and configured to deliver the detection message to a remote user terminal via a communication network.

In still another example embodiment, a mobile signal transmitter is used in a system for tracking a location of a person having a mobile signal transmitter. The system includes at least one receiver. The receiver receives an unique Identification (ID) signal transmitted by the mobile signal transmitter that transmits, at at least one predetermined period, the unique ID signal uniquely determined for respective mobile signal transmitter, stores the received unique ID signal, searches for a requested specific ID when a search request for a specific ID is received from an external server, and transmits transmission information including an ID corresponding to the requested ID to the external server. The signal transmitter includes a transmission signal generation unit configured to generate, at at least one predetermined period, the ID signal uniquely determined for respective signal transmitter. In yet still another example embodiment, a sensor network gateway is used in a system for tracking a location of a person having a signal transmitter. The system includes at least one sensor network gateway and a backbone gateway that interworks with an internet network and delivers a detection message received from the sensor network gateway to the internet network. The sensor network gateway detects an unique Identification (ID) signal from a mobile signal transmitter for transmitting, at at least one predetermined period, the unique ID signal uniquely determined for respective signal transmitter, generates a detection message including the unique ID, and transmits the detection message to the backbone network.

In yet still another example embodiment, a method of tracking a location of a person having a mobile signal transmitter tracks the location of the person having the mobile signal transmitter in conjunction with the mobile signal transmitter for transmitting a unique Identification (ID) signal uniquely determined for respective mobile signal transmitter. The method includes: receiving the unique ID signal transmitted by the mobile signal transmitter near circumference of the person having the signal transmitter to store the received unique ID signal; and when a search request for a specific ID is received from an external server, searching for the requested ID and transmitting transmission information including an ID corresponding to the requested ID to the external server.

In yet still another example embodiment, a method of tracking a location of a person having a mobile signal transmitter in a system, which includes at least one sensor network gateway and a backbone gateway for interworking with an internet network and tracks the location of the person having the mobile signal transmitter, includes: detecting an unique Identification (ID) signal from the mobile signal transmitter for transmitting, at at least one predetermined period, the unique ID signal uniquely determined for respective mobile signal transmitter by the at least one sensor network gateway, and generating a detection message including the unique ID by the at least one sensor network gateway; and interworking with the internet network in a multi-hop way, receiving the detection message and delivering the detection message to a remote user terminal via communication network by the backbone gateway. The present invention actively utilizes existing mobile communication network infrastructures and uses mobile communication terminals held by citizens as receipt means. That is, the citizens' mobile communication terminals act respectively as memory cells. Therefore, many IDs and location information log data are respectively stored in the respective mobile communication terminals. That is, all mobile communication terminals located scatteredly constitute a huge scattered database. Many IDs transmitted by signal transmitters held by a tracking target (children, women, vehicles, or the like) and location information log data are scatteredly stored in the mobile communication terminals of the citizens. When a search request for a specific ID is generated by a communication company's server in order to track the ID, the mobile communication terminals which stores information related to the ID transmit the information related to the ID rapidly in response to the request.

According to a system for tracking a location of a person having a signal transmitter and a method for tracking a location of a person having a signal transmitter according to embodiments of the present invention, the person, such as an abducted person, carries a mobile signal transmitter by attaching the mobile signal transmitter on the cloth or body of the person rather than a mobile communication terminal. An unspecified mobile communication terminal or sensor network gateway located near a place, at which the abducted person is located, receives an ID signal transmitted by the signal transmitter at a predetermined time or at at least one predetermined period, processes the received ID signal in response to the request from a mobile communication company's server or a remote user terminal and tracks the location of the abducted person and a path along which the abducted person moved.

According to a conventional method of tracking the location of an abducted person, the history information about the past locations of the abducted person is not stored, and it was difficult to obtain the past and current locations of the abducted person. In order to resolve above problem, the method for tracking a location of a person having a signal transmitter according to example embodiments of the present invention collects log data from a plurality of mobile communication terminals or a plurality of sensor networks and obtains a path along which the abducted person moved for a predetermined time, for example, one month, therefore both the past location (a location where an accident has occurred) and the current location of the abducted person may be tracked.

The method for tracking a location of a person having a signal transmitter according to example embodiments of the present invention can be an enhanced solution for locating children (missing or kidnapping), women (sexual assault), handicapped persons (missing), pets (missing), vehicles (hit-and-run case), criminals watched by police.

According to example embodiments of the present invention, it is possible to utilize a plurality of mobile communication terminals held by persons as a huge virtual database. A vest infrastructure is required to collect, manage and search many location log data output from all signal transmitters in one database. However, according to example embodiments of the present invention, many location data are scatteredly stored on the respective mobile communication terminal. When there is a need for tracking a specific ID, mobile communication terminals located in a predetermined area, or in all areas, are requested to search for the ID, and only mobile communication terminals which store the corresponding ID as log data response to the request. As a result, an economical model may be achieved in view of communication costs and management costs.

Furthermore, polices which investigate an accident can decrease time and costs required for investigating the accident. The reason for this is that polices can perform investigation from a focused group. If only polices is allowed for searching for information, a lot of requests for minor accidents may increase, thereby bring difficulty to polices' business.

Furthermore, when the present invention is interworked with a location based search service, services for customers may be possible. If it is necessary to locate a missing child using a pre-registered telephone, a map search service which is one of internet information services (for example, Nate of SK) may be interworked with the present invention, the current location of the missing child may be indicated on a map and furthermore a path which reaches to the missing child may be informed.

Such services provide a separate benefit model to a mobile communication company. That is, the benefit model of the mobile communication company is possible by a higher-value added service called a location-tracking service and the increase of communication fee.

Furthermore, when a 6LoWPAN_based sensor network according to another example embodiment of the present invention is utilized, sensor nodes have IPs respectively, so that bidirectional communication may be performed using a short message or a simple signal between a signal transmitter 10 and a receiver 60. Therefore the advantages of the IPTV may be utilized actively. Furthermore, it is possible to provide various ubiquitous-lift services to regional residents through such service models.

Furthermore, it is also possible to provide safety services to protect the child's safety using information about the child's position and situations using a sensor network service via a broadcasting communication network.

BRIEF DESCRIPTION OF THE DRAWINGS

Example embodiments of the present invention will become more apparent by describing in detail example embodiments of the present invention with reference to the accompanying drawings, in which.

DETAILED DESCRIPTION OF EXAMPLE EMBODIMENTS

Figure 1:
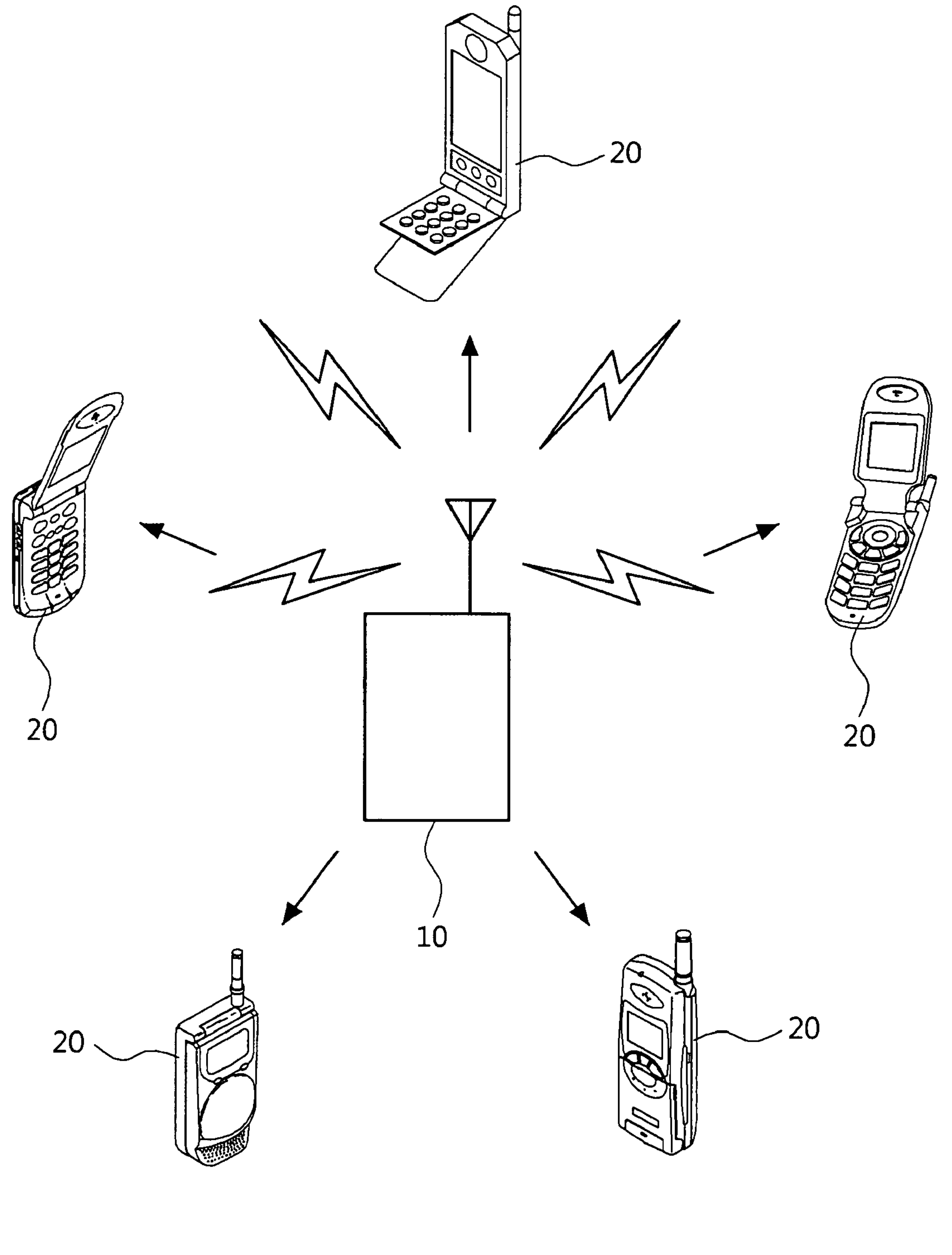
FIG. 1 is a conceptual diagram illustrating a system for tracking the location of a person which holds a signal transmitter according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

FIG. 1 is a conceptual diagram illustrating a system for tracking the location of a person which holds a signal transmitter according to an example embodiment of the present invention. The signal transmitter 10 transmits signals continually. The transmitted signals have a unique Identification (ID) which is uniquely determined and registered for respective signal transmitter 10. The unique ID, which is continually transmitted, is received by at least one receivers 20 located near the signal transmitter 10, for example, near a place where a person having the signal transmitter 10 is abducted, alternatively near a place where an abducted person is located. The receiver 20 may be a dedicated reception terminal installed at a peripheral of a mobile communication terminal or a person such as an abducted person. The dedicated reception terminal may be, for example, a sensor network gateway. The receiver 20 receives, stores the unique ID transmitted by the signal transmitter 10, retrieves the corresponding ID when a search request for a specific ID is received from an external server, and transmits transmission information including the unique ID, receipt location data, information about ID receipt time, information about whether the received ID is a short-distance signal or a long-distance signal, information about an area where the unique ID is received, and the like to the external server.

FIG. 1 represents case in which the receiver 10 is a mobile communication terminal. The mobile communication terminal 20 receives an unique ID transmitted by the signal transmitter 10 and stores the received unique ID, when a search request for a specific ID is received from the mobile communication company's server, and transmits transmission information including the unique ID, receipt location data, information about receipt time, information about whether the received ID is a short-distance signal or a long-distance signal, information about an area where the unique ID is received, and the like to the mobile communication company's server.

The signal transmitter 10 may have the form of a badge, a necklace or a nameplate so that a criminal may not perceive the signal transmitter 10 because the signal transmitter 10 is small and light enough, or so that the signal transmitter 10 may be carried by a person comfortably. Furthermore, the signal transmitter 10 may be designed to be attached to a vehicle. The hardware of the signal transmitter 10 may be designed to be operable more than one year using a small battery such as a mercury cell.

The frequency of the ID signals which are continually transmitted by the signal transmitter 10 at a predetermined period may have the band of the frequency used for the mobile communication. Therefore, the signal transmitter 10 may include a modem chip used for the mobile communication terminal—for example a modem chip for the second generation (2G), such as GSM, a modem chip for the third generation (3G), such as CDMA or WCDMA—or a modem chip used for next generation such as WiBro or Mobile WiMAX.

The transmission power of the transmitted ID signal may be modified in various ways by a person skilled in the art. However, when the transmission power is very low, for example, when the transmission of the ID signal is performed with the power for transmission distance, for example, about 30 m, the lifetime of a battery may increase and the accuracy (resolution) for tracking the location of the abducted person may improve, but the number of mobile communication terminals which can receive the ID may decrease. When the transmission power is too large, for example, when the transmission is performed with the power for transmission distance, for example, about 100 m, the number of mobile communication terminals which can receive the ID may increase, but the accuracy (resolution) for tracking the location of the abducted person may degrade, the lifetime of a battery may decrease.

In order to solve above problems, a transmission period and a transmission power may be set according to more than two methods. For example, while an ID signal (hereinafter referred to as an "short-distance signal") may be transmitted at every one minute with the transmission power level for the transmission distance of 30 m and an ID signal (hereinafter referred to as an "long-distance signal") may be transmitted at every ten minutes with the transmission power level for the transmission distance of 100 m, thereby taking the advantages of the both methods and sufficiently achieving the object of the present invention.

The mobile communication terminal 20 simply receives transmitted ID signals and processes received ID signals as a receiver when a predetermined program or a predetermined module is merely installed on existing mobile communication terminal. Furthermore, a manufacture company may provide a mobile communication terminal on which the program has been already installed.

Besides personal portable mobile communication terminals, a plurality of terminals as the receiver may be installed in predetermined places, such as amusement parks, public institutions, school zones, roads, or the like. In this case, it is possible to resolve a problem in which excessive data transactions are generated by too many mobile communication terminals in a populated area (details are described below).

In summary, one's mobile communication terminal 20 may receive ID signal transmitted by the signal transmitter 10 before an accident, such as kidnapping, abduction, missing, or the like, occurs, and stores the received ID signal. After the accident, another person's mobile communication terminal 20 may receive the ID transmitted by the signal transmitter 10 and stores the ID as long as the signal transmitter 10 continually transmits the ID signal. In such a way, IDs stored by a plurality of unspecified persons' mobile communication terminals may be processed according to a predetermined algorithm, thereby tracking the location of an abducted person, details are described below with reference to separate figure.

Figure 2:
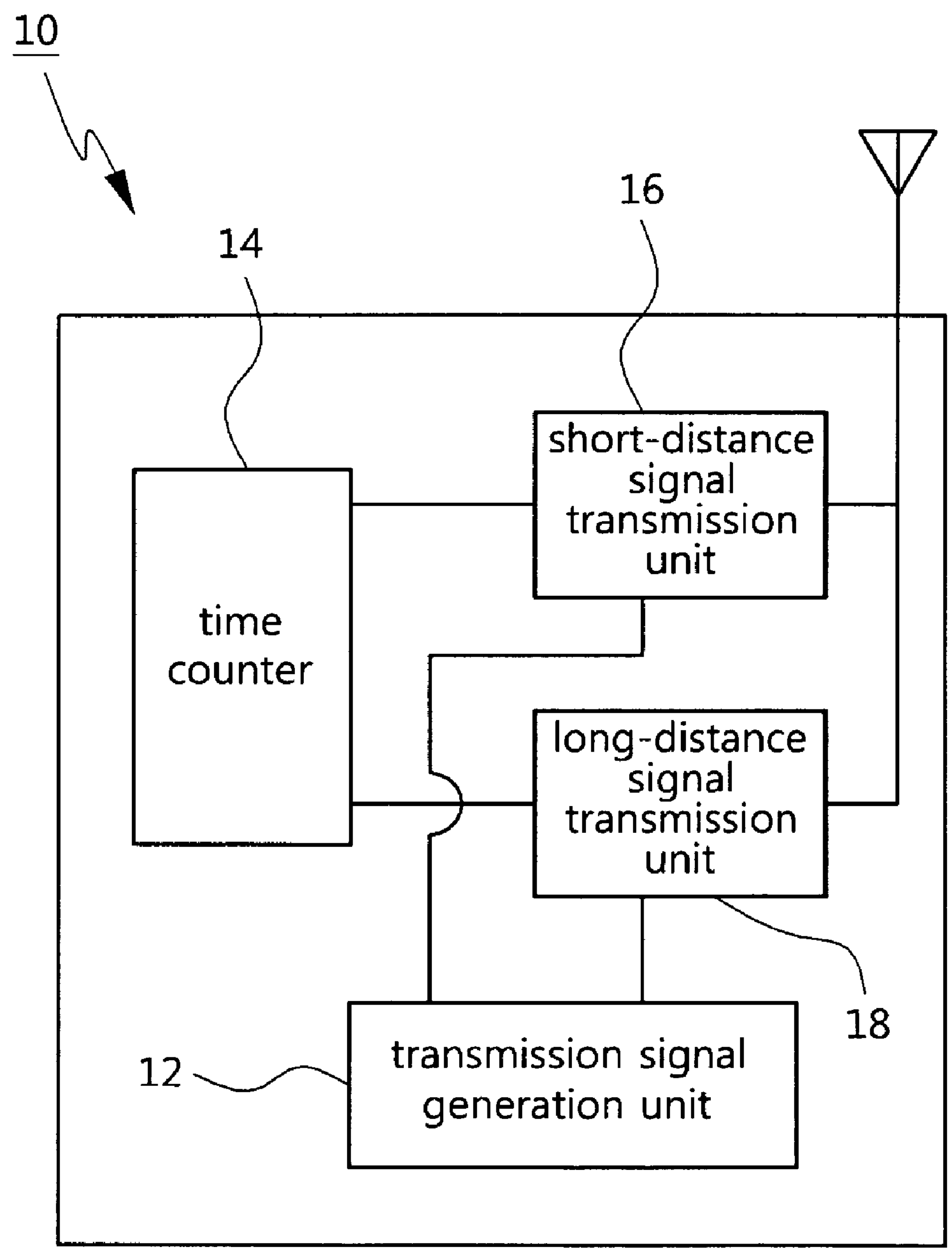
FIG. 2 is a conceptual diagram illustrating a signal transmitter used for tracking the location of a person which holds the signal transmitter according to an example embodiment of the present invention.

FIG. 2 is a conceptual diagram illustrating a signal transmitter, which transmits two signals such as a short-distance signal and a long-distance signal, according to an example embodiment of the present invention.

The signal transmitter 10 shown in FIG. 2 includes a transmission signal generation unit 12, a time counter 14, a short-distance signal transmission unit 16 and a long-distance signal transmission unit 18. Besides above components, the signal transmitter 10 may further include other components required for the basic operations of the signal transmitter—such as a power supply unit, a modulation unit, an amplification unit, an antenna, and the like —, and above other components may be easily implemented by a person skilled in the art without the detailed description thereof.

The transmission signal generation unit 12 generates an unique ID signal uniquely determined for respective signal transmitter 10.

The short-signal transmission unit 16 transmits a low-power signal for a predetermined time so as to be transmitted only up to a short distance (for example, about 30 m). The long-signal transmission unit 18 transmits a high-power signal for a predetermined time (or at a predetermined time) so as to be transmitted up to a long distance (for example, 100 m).

A time counter 14 is a timer for calculating a period or a point of time at which the short-distance signal transmission unit 16 and the long-distance signal transmission unit 18 transmit the ID signal. For example, in case where the short-distance signal is designed to be transmitted every one minute and the long-distance signal is designed to be transmitted every 10 minutes, the time counter counts every one minute which is a period of transmission of the short-distance signal, and, at the same time, counts every 10 minutes which is a period of the transmission of the long-distance signal, thereby allowing the long-distance signal transmission unit 18 to transmit the long-distance signal.

As described above, the time counter 14, the short-distance signal transmission unit 16 and the long-distance signal transmission unit 18 are only an example embodiment of the present invention for the purpose of achieving the object of the present invention, and, therefore, the present invention is not limited to above implementation of FIG. 2.

Meanwhile, the receiver may be implemented using a hardware chip set used in all types of terminals—for example, portable phones, PDA (Personal Digital Assistants) phones, DMB (Digital Multimedia Broadcasting) phones, Wibro phones, or the like. It is noted that a program that processes above method of tracking the location of a person having the signal transmitter according to one example embodiment of the present invention may be installed as software on the hardware chip set.

Figure 3:
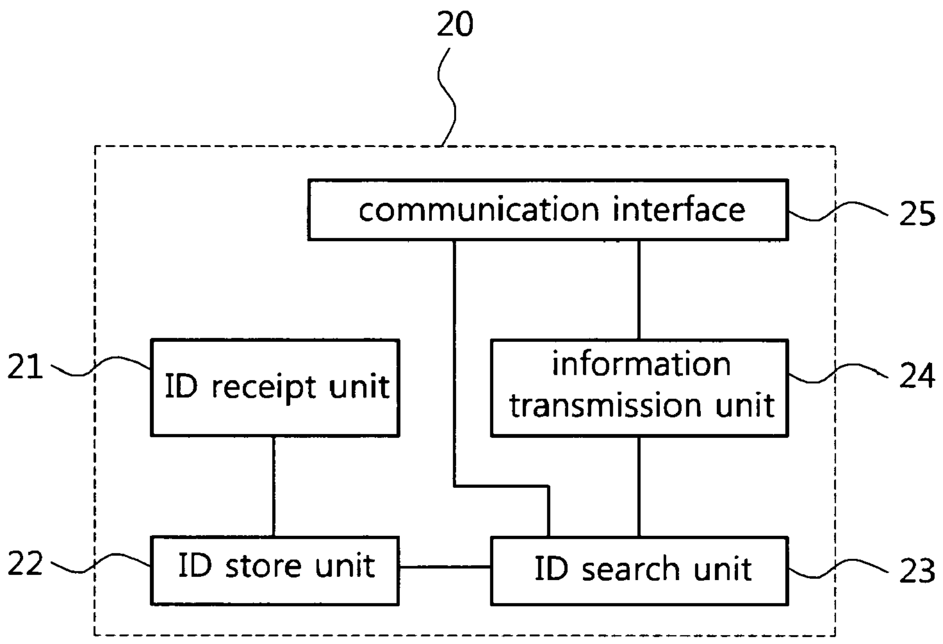
FIG. 3 illustrates a functional diagram of a program installed on a mobile communication terminal used for tracking the location of a person which holds the signal transmitter according to an example embodiment of the present invention.
Figure 4:
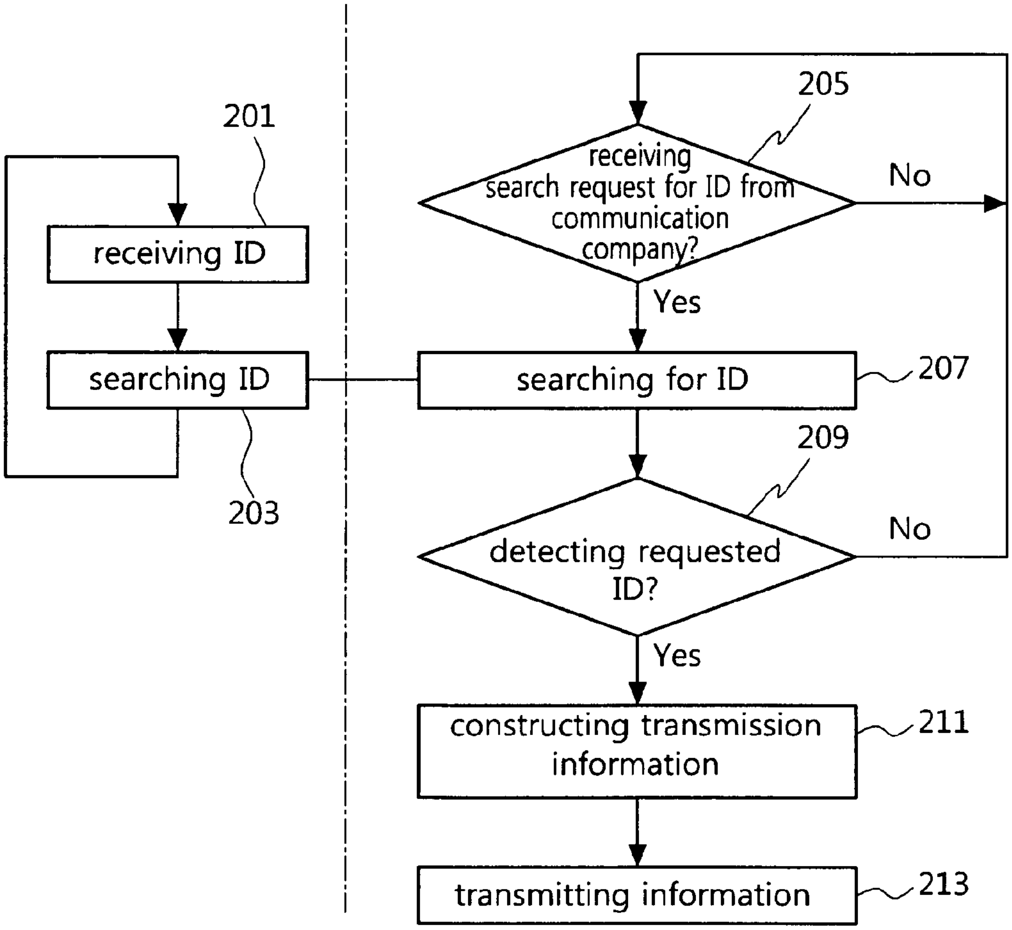
FIG. 4 is a flowchart illustrating a method of tracking the location of a person having the signal transmitter according to an example embodiment of the present invention.

FIG. 3 illustrates a functional diagram of a program installed on a mobile communication terminal used for tracking the location of a person which holds the signal transmitter according to an example embodiment of the present invention, and FIG. 4 is a flowchart illustrating a method of tracking the location of a person having the signal transmitter according to an example embodiment of the present invention.

Referring to FIGS. 3 and 4, the construction and operation of an apparatus for tracking the location of a person having a signal transmitter according to an embodiment of the present invention and the method of tracking the location of a person having a signal transmitter are described below.

An ID receipt unit 21 receives an ID signal whenever the ID receipt unit senses the ID signal transmitted by the signal transmitter 10 (step 201 in FIG. 4), and the ID store unit 22 stores transmission information—that is, [ID, receipt time, receipt area] data—including the receipt time, receipt location (step 203). In an example embodiment of the present invention, where the ID signals transmitted by the signal transmitter 10 are distinguished into the short-distance signal and the long-distance signal and then are transmitted as the short-distance signal and the long-distance signal, the transmission information may be constructed like [ID, receipt time, the type of a received ID (short-distance or long distance signal), receipt area].

A communication interface 25 receives a request signal transmitted from a mobile communication company's server (step 205), acquires location information obtained by performing data processing (step 207, 209 and 211), and transmits the location information to the mobile communication company (step 213).

When a search request signal for a specific ID (the ID of a signal transmitter targeted for tracking the location) is received from the mobile communication company's server through the communication interface 25 (step 205), an ID search unit 23, which is the component of a program installed on the mobile communication terminal 20, performs search operation to determine whether the requested ID exists in the stored transmission information (step 207). When the corresponding ID exists (step 209), the information transmission unit 24 constructs transmission information data by adding the telephone number of the mobile communication terminal to the transmission information related to the ID (that is, [ID, receipt time, receipt area], or as [ID, receipt time, the type of a received ID (short-distance or long distance signal), receipt area]) and transmits the transmission information data to the communication company' server via the communication interface 25 (step 213).

The communication company's server analyzes the received transmission information data and tracks the current location of the signal transmitter 10 and a path along which the signal transmitter 10 moved (not shown). Therefore, it is possible to easily detect criminals, eye witnesses, and residents at the peripheral of the accident by checking the telephone numbers of the mobile communication terminals collected using the above-described method. The communication company's server collects the transmission information data from a plurality of mobile communication terminals, which operates as the receiver, as log data, obtains a path along which a person, such as an abducted person, moved for a predetermined time, for example, one month, and thus is able to track both the past location (a location where an accident occurred) and the current location of the abducted person.

The system for tracking the location of the abducted person according to another example embodiment of the present invention may be implemented using a sensor network. The sensor network may be, for example, Ubiquitous Sensor Network (USN). The USN may be IPv6 over Low power WPAN (6LoWPAN) which is an IPv6-based low-power wireless private network, and the present invention is not limited to 6LoWPAN and may include other short-range sensor networks which can interwork with Internet network.

Figure 5:
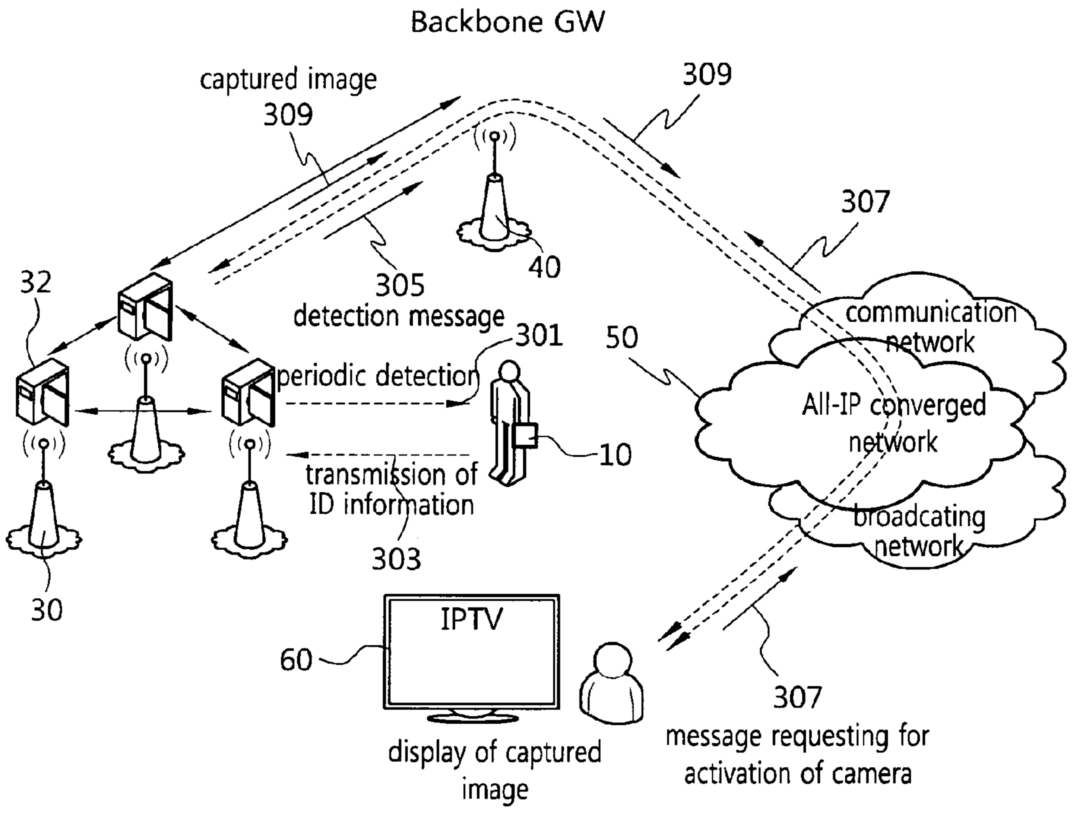
FIG. 5 is a conceptual diagram illustrating a system of tracking the location of a person which holds a signal transmitter according to another example embodiment of the present invention.

FIG. 5 is a conceptual diagram illustrating a system of tracking the location of a person which holds a signal transmitter according to another example embodiment of the present invention.

Referring to FIG. 5, the system for tracking the location of an abducted person having the signal transmitter according to another example embodiment of the present invention includes a signal transmitter 10, a sensor network gateway 30, a backbone gateway 40 and a remote user terminal 60.

The signal transmitter 10 may be a mobile sensor. The sensor network gateway 30 may be a gateway supporting a sensor network which can interwork with an external internet network. The sensor network gateway 30 may be IPv6 over Low power WPAN (6LowPAN) which can interwork with IPv6_based network. The sensor network gateway 30 may further include a camera for taking a picture of the circumference of the sensor network gateway 30 and capturing the picture of the circumference of the sensor network gateway 30. The camera may be installed on the sensor network gateway 30.

In case the sensor network gateway 30 is the 6LowPAN gateway, the operation of the system for tracking the location of an abducted person according to another example embodiment of the present invention is described below.

The sensor network gateway 30 periodically enters to a listening state in order to detect the ID of a peripheral mobile sensor (step 301).

A person having the signal transmitter 10, such as the mobile sensor, reaches the circumstance of the sensor network gateway 30 and allows the signal transmitter 10's ID information to be delivered to the sensor network gateway 30 (step 303).

The sensor network gateway 30, which acquired the ID information, delivers a detection message by multi-hop way to the backbone gateway 40 interworking with an Internet network (step 305). The detection message may be delivered to the remote user terminal 60 via a communication network 50, for example, an ALL-IP converged network. The detection message may include the ID, receipt time and/or receipt location. The remote user terminal 60 may be an IPTV terminal installed at home. Between sensor network gateways 30 implemented by 6LoWPAN according to an example embodiment of the present invention, Multi-hop communication is possible, and data can be delivered up to the backbone gateway 40.

The 6LoWPAN_based backbone gateway 40 interworks with an existing Internet network to deliver the detection data to a heterogeneous network, such as the Internet network, and acquire information from the heterogeneous network. The backbone gateway 40 receives the detection data from the plurality of sensor network gateways 30 and stores the received detection data as log data, and therefore the detection data may be used for obtaining a path along which a person, such as an abducted person, moved for a predetermined time, for example, one month, and may be used for tracking both the past location (a location where an accident has occurred) and the current location of the abducted person.

Parents, who are watching an IPTV, can check the safety and location of their child through a remote user terminal 60. When a child having the signal transmitter passes near the sensor network gateway 30, the sensor network gateway 30 checked the unique ID transmitted by the signal transmitter 10, transmits related information to the remote user terminal 60. When the parents transmit a message requesting for the activation of the camera to the sensor network gateway 30, the sensor network gateway 30 transmits the streams of the captured image to the remote user terminal 60, such as the IPTV, therefore the parents can check the safety and location of their child in real time.

When the 6LoWPAN_based sensor network according to an example embodiment of the present invention is used, sensor nodes have the Internet Protocol (IP), so that bidirectional communication may be performed between the signal transmitter 10 and the remote user terminal 60 using a short message or a simple signal. Therefore, the advantages of the IPTV may be actively utilized. Furthermore, it is possible to provide various ubiquitous-lift services to regional residents through such service models.

Furthermore, it is possible to provide safety services to protect the child's safety using information about the child's position and situation using the sensor network service via a broadcasting communication network.

The sensor network gateway 30 implemented by the 6LoWPAN according to an example embodiment of the present invention may be installed on places where many people come and go frequently, for example, traffic lights, parks, street lamps, public offices, public institutions, or the like.

The sensor network gateway 30 implemented by the 6LoWPAN according to one example embodiment of the present invention may be easily installed and the implementation cost is lower than that of existing wired and wireless network infrastructures, thereby being effective in view of facility investment.

In the future, it is expected that an ALL-IP converged network supporting broadband communications/broadcasting convergence services and ubiquitous services at low costs will developed and a broadband communication network and a sensor network will be integrated together, therefore, a service into which the sensor network and the broadcasting communication network are integrated may be used in the future. In this case, the need for parents to check the safety and situations of their children at home may increase rapidly, and therefore, it is possible to establish a system for tracking the location of an abducted person using the service into which the sensor network and the IPTV are integrated.

Besides, in areas where children are concentrated (for example, amusement parks, school zones, libraries, or the like), excessive communication transactions will occur because many mobile communication terminals received the ID transmitted by a signal transmitter. In order to resolve this problem, as a first method, when a mobile communication terminal enters a corresponding area, a receipt function may be locked temporally, and then the lock status may be automatically released after a predetermined time lapsed. Such a function may be integrated into a track processing program installed on the mobile communication terminal. As a second method, the transmission information data may be received from receipt terminals (readers) installed separately rather than from the mobile communication terminals of persons which enter into a specific area. Using the second method, it is possible to install separate readers in important locations—for example, school zones, public offices, cross-street lamps, highway tollgates, national road entry ramps, public transportations, or the like—and to collect transmission information data via the readers.

Furthermore, in case where a mobile communication terminal near an abducted person receives one same ID for long time, there is an problem that excessive transactions occur and meaningless data are occupied at the memory of the mobile communication terminal, so that the memory may store an ID at a start time point, an end time point and a intermediate (or central) time point between the two start time point and the end time point rather than the memory stores all ID data in the mobile communication terminal.

Furthermore, when a map search service provided by a mobile communication terminal of a parents (or protector) of a missing child or an abducted person interworks with the present invention, it is possible to provide a service for directly providing information about an area at which a target for tracking is located, and a path along which the target moved. Furthermore, when a signal transmitter is obligatorily installed on all vehicles, vehicle theft, and hit-and-run accidents are well prevented.

While the example embodiments of the present invention and their advantages have been described in detail, it should be understood that various changes, substitutions and alterations may be made herein without departing from the scope of the invention.

What is claimed is:

1. A system for tracking a location of a person having a mobile signal transmitter, the system tracking the location of the person having the signal transmitter in conjunction with the mobile signal transmitter for transmitting an Identification (ID) signal that is uniquely determined for respective mobile signal transmitter, the system comprising:

at least one receiver configured to receive the unique ID signal transmitted by the signal transmitter, wherein the at least one receiver receives the unique ID signal near circumference of the person having the signal transmitter spaced apart from the receiver by a given distance, and stores the received unique ID signal in an ID store unit, and wherein the at least one receiver, when a search request for a specific ID is received from an external server, searches for the requested ID in the ID store unit and transmits transmission information including an ID corresponding to the requested ID to the external server, wherein the signal transmitter continually transmits the unique ID signal at least one given period, and wherein the signal transmitter comprises:

a transmission signal generation unit configured to generate the unique ID signal;

a short-distance signal transmission unit configured to transmits the unique ID signal generated by the transmission signal generation unit for a predetermined time, the unique ID signal transmitted by the a short-distance signal transmission unit having a power which allows the unique ID signal to be transmitted up to a first distance relatively close to the short-distance signal transmission unit;

a long-distance signal transmission unit configured to transmit the unique ID signal generated by the transmission signal generation unit for a predetermined time, the unique ID signal transmitted by the a long-distance signal transmission unit having a power which allows the unique ID signal to be transmitted up to a second distance relatively longer than the first distance; and a time counter configured to calculate the at least one given period or a point of time at which the short-distance signal transmission unit and the long-distance signal transmission unit transmit the unique ID signal.

2. The system of claim 1, wherein the receiver includes a mobile communication terminal held by an unspecified person located near the circumference of the person having the signal transmitter, and the external server includes a mobile communication company's server; and wherein the receiver comprises:

an ID receipt unit configured to receive the unique ID signal whenever the ID receipt unit senses the unique ID signal transmitted by the signal transmitter;

an ID store unit configured to store the unique ID, an ID receipt time, information about whether the received unique ID is a short-distance signal or a long-distance signal, and information about an area where the unique ID is received;

a communication interface configured to receive a request signal transmitted from the mobile communication company's server, configured to perform data processing according to the request signal to location information, and configured to transmit the location information to the mobile communication company's server; and search request for a specific ID an ID search unit configured to perform search the stored transmission information to determine whether requested ID exists in the stored transmission information when the search request signal for a specific ID of a signal transmitter targeted for tracking is received from the mobile communication company's server through the communication interface, wherein the receiver generates transmission information data, the transmission information data is obtained by adding a telephone number of the mobile communication terminal to the transmission information related to the requested ID when the requested ID exists, and transmits the transmission information data to the mobile communication company's server through the communication interface.

3. The system of claim 2, wherein the mobile communication company's server collects the transmission information data from a plurality of mobile communication terminals as log data, obtains a path along which the person moved for a predetermined time, and tracks both a location at which an accident has occurred to the person and a current location of the person.

4. The system of claim 1, wherein the receiver is a dedicated receiving terminal installed on a predetermined place near the circumference of the person having the signal transmitter.

5. A system for tracking a location of a person having a signal transmitter using a sensor network interworking with an internet network, the system comprising at least one sensor network gateway configured to detect an unique Identification (ID) signal from a mobile signal transmitter for continually transmitting the unique ID signal at least one predetermined period, and configured to generate a detection message including the unique ID; and a backbone gateway configured to interwork with the internet network in a multi-hop way, configured to receive the detection message including the unique ID, an ID receipt time and an ID receipt location, and configured to deliver the detection message to a remote user terminal including an Internet Protocol Television (IPTV) terminal via a communication network, wherein the backbone gateway receives the detection message from the at least one sensor network gateway, stores the detection message as log data, obtains a path along which the person moved for a predetermined time, and tracks both a location at which an accident has occurred to the person and a current location of the person, wherein the sensor network gateway further comprises a camera for taking a picture of circumference of the sensor network gateway to capture the picture of the circumference of the sensor network gateway, wherein the remote user terminal transmits a message requesting for activation of the camera to the sensor network gateway via the backbone gateway, and wherein the sensor network gateway that received the message requesting for the activation of the camera, operates the camera to capture the picture of the circumference of the sensor network gateway, and transmits the captured picture of the circumference to the remote user terminal.

6. A mobile signal transmitter used in a system for tracking a location of a person having a mobile signal transmitter, the system including at least one receiver, the receiver receiving an unique Identification (ID) signal transmitted by the mobile signal transmitter that transmits, at least one predetermined period, the unique ID signal uniquely determined for respective mobile signal transmitter, storing the received unique ID signal, searching for a requested specific ID when a search request for a specific ID is received from an external server, and transmitting transmission information including an ID corresponding to the requested ID to the external server, the signal transmitter comprising a transmission signal generation unit configured to generate, at least one predetermined period, the ID signal uniquely determined for respective signal transmitter;

a short-distance signal transmission unit configured to transmits the unique ID signal generated by the transmission signal generation unit for a predetermined time the unique ID signal transmitted by the a short-distance signal transmission unit having a power which allows the unique ID signal to be transmitted up to a first distance relatively close to the short-distance signal transmission unit;

a long-distance signal transmission unit configured to transmit the unique ID signal generated by the transmission signal generation unit for a predetermined time, the unique ID signal transmitted by the a long-distance signal transmission unit having a power which allows the unique ID signal to be transmitted up to a second distance relatively longer than the first distance; and a time counter configured to calculate the at least one given period or a point of time at which the short-distance signal transmission unit and the long-distance signal transmission unit transmit the unique ID signal, wherein the signal transmitter continually transmits the unique ID signal at least one given period.

7. A method of tracking a location of a person having a mobile signal transmitter, the method tracks the location of the person having the mobile signal transmitter in conjunction with the mobile signal transmitter for transmitting a unique Identification (ID) signal uniquely determined for respective mobile signal transmitter, the method comprising:

receiving the unique ID signal transmitted by the mobile signal transmitter near circumference of the person having the signal transmitter to store the received unique ID signal; and when a search request for a specific ID is received from an external server, searching for the requested ID and transmitting transmission information including an ID corresponding to the requested ID to the external server, wherein the step of receiving the unique ID signal transmitted by the mobile signal transmitter comprises:

receiving the unique ID signal whenever the unique ID signal transmitted by the mobile signal transmitter is sensed; and storing the unique ID, an ID receipt time, information about whether the received ID is a short-distance signal or a long-distance signal, and information about an area where the unique ID signal is received, wherein the step of searching for the requested ID and transmitting transmission information including an ID corresponding to the requested ID to the external server comprises:

performing a search for determining whether the requested ID exists in the stored transmission information when a search request signal for a specific ID of a mobile signal transmitter targeted for tracking is received from a mobile communication company's server; and generating transmission information data to transmit the transmission information data to the mobile communication company's server, the transmission information data being obtained by adding a telephone number of a mobile communication terminal to the transmission information related to the requested ID when the requested ID exists, and wherein the method of tracking a location of a person having a mobile signal transmitter collects the transmission information data from a plurality of mobile communication terminals as log data, obtains a path along which the person moved for a predetermined time and tracks both a location at which an accident has occurred to the person and a current location of the person.

* * * * *